(12) United States Patent
Han

(10) Patent No.: US 9,172,098 B2
(45) Date of Patent: Oct. 27, 2015

(54) FUEL CELL STACK WITH IMPROVED CORROSION RESISTANCE

(75) Inventor: Kook Il Han, Seoul (KR)

(73) Assignee: Hyundai Motor Company, Seoul (KR)

( * ) Notice: Subject to any disclaimer, the term of this patent is extended or adjusted under 35 U.S.C. 154(b) by 529 days.

(21) Appl. No.: 13/152,463

(22) Filed: Jun. 3, 2011

(65) Prior Publication Data
US 2012/0237847 A1    Sep. 20, 2012

(30) Foreign Application Priority Data

Mar. 15, 2011   (KR) .................. 10-2011-0023094

(51) Int. Cl.
*H01M 8/02*     (2006.01)
*H01M 8/24*     (2006.01)

(52) U.S. Cl.
CPC .......... *H01M 8/0276* (2013.01); *H01M 8/0206* (2013.01); *H01M 8/2465* (2013.01); *H01M 8/028* (2013.01); *Y02E 60/50* (2013.01)

(58) Field of Classification Search
CPC ....... H01M 8/02; H01M 8/24; H01M 8/0247; H01M 8/0254; H01M 8/0297; H01M 8/1004; Y02E 60/50; Y02E 60/521
USPC ......... 429/469, 468, 467, 452, 460, 507, 508, 429/510, 129, 139, 34, 400; 29/623.1
See application file for complete search history.

(56) References Cited

U.S. PATENT DOCUMENTS

| | | | |
|---|---|---|---|
| 5,176,966 A * | 1/1993 | Epp et al. ................ | 429/438 |
| 5,264,299 A * | 11/1993 | Krasij et al. ............ | 429/492 |
| 5,284,718 A * | 2/1994 | Chow et al. ............. | 429/438 |
| 6,080,503 A * | 6/2000 | Schmid et al. .......... | 429/483 |
| 6,322,920 B1 * | 11/2001 | Tomson .................. | 429/469 |
| 6,338,492 B1 * | 1/2002 | Schilling et al. ....... | 277/630 |
| 6,372,373 B1 | 4/2002 | Gyoten et al. | |
| 6,596,427 B1 * | 7/2003 | Wozniczka et al. ..... | 429/435 |

(Continued)

FOREIGN PATENT DOCUMENTS

| | | | | |
|---|---|---|---|---|
| DE | 4309976 | * | 9/1994 | ........... H01M 8/02 |
| FR | 2833870 | * | 6/2003 | ........... B23D 15/00 |

(Continued)

OTHER PUBLICATIONS

DUPONT bynel_4105 Product Data Sheet Jan. 8, 2010.*

(Continued)

*Primary Examiner* — Patrick Ryan
*Assistant Examiner* — Aaron Greso
(74) *Attorney, Agent, or Firm* — Mintz Levin Cohn Ferris Glovsky and Popeo, P.C.; Peter F. Corless

(57) ABSTRACT

The present invention provides a fuel cell stack with improved corrosion resistance, in which the outer edge of the fuel cell stack including an outer cut portion of each metallic bipolar plate can be effectively prevented from being corroded. For this purpose, the present invention provides a fuel cell stack including a waterproof member which is formed at an outer edge of a metallic bipolar plate to seal a gap between joined surfaces of the metallic bipolar plate, a membrane-electrode assembly, a gas diffusion layer, and a gasket from the outside thereof such that water vapor and moisture from the fuel cell stack are prevented from being brought into contact with an outer cut portion of each metallic bipolar plate by the waterproof member.

2 Claims, 5 Drawing Sheets

(56) References Cited

U.S. PATENT DOCUMENTS

| | | | |
|---|---|---|---|
| 2002/0048699 A1* | 4/2002 | Steele et al. | 429/30 |
| 2002/0068212 A1* | 6/2002 | Osenar et al. | 429/36 |
| 2004/0151975 A1* | 8/2004 | Allen | 429/38 |
| 2005/0058878 A1* | 3/2005 | Martin | 429/34 |
| 2005/0095490 A1* | 5/2005 | Mittelstadt et al. | 429/35 |
| 2005/0277007 A1* | 12/2005 | Yoshitake et al. | 429/32 |
| 2006/0073385 A1* | 4/2006 | Andrin et al. | 429/185 |
| 2006/0183014 A1* | 8/2006 | Levandoski et al. | 429/36 |
| 2006/0292428 A1* | 12/2006 | Suh | 429/35 |
| 2008/0050632 A1* | 2/2008 | Salter et al. | 429/30 |

FOREIGN PATENT DOCUMENTS

| | | | | | |
|---|---|---|---|---|---|
| JP | 2002134134 A | 5/2002 | | | |
| JP | 2004095429 A | 3/2004 | | | |
| JP | 2006331737 A | 12/2006 | | | |
| JP | 2007-048757 A | 2/2007 | | | |
| JP | 2009146700 A | 7/2009 | | | |
| WO | WO 2006/047271 | * | 5/2006 | | H01M 2/08 |

OTHER PUBLICATIONS

D 955 MSDS Sealed Air Corporation May 20, 2004 {http://www.plasticsdist.com/product/shrink/pdf/bdf2001_msds.pdf}.*

Tape Real Dictionary Princeton University Available May 2003 {http://www.realdictionary.com/?q=tape}.*

* cited by examiner

FUEL CELL STACK WITH IMPROVED CORROSION RESISTANCE

CROSS-REFERENCE TO RELATED APPLICATION

This application claims under 35 U.S.C. §119(a) the benefit of Korean Patent Application No. 10-2011-0023094 filed Mar. 15, 2011, the entire contents of which are incorporated herein by reference.

BACKGROUND (a) Technical Field

The present invention relates to a fuel cell stack. More particularly, it relates to a fuel cell stack with improved corrosion resistance, in which the outer edge of the fuel cell stack including an outer cut portion of each metallic bipolar plate can be effectively prevented from being corroded.

(b) Background Art

A fuel cell is an electrical generation system that does not convert chemical energy of fuel into heat by combustion, but rather electrochemically converts the chemical energy directly into electrical energy in a fuel cell stack. A fuel cell can be applied to the electric power supply of small-sized electrical and electronic devices, for example, portable devices, as well as industrial and household appliances and vehicles.

One of the most attractive fuel cells for a vehicle is a proton exchange membrane fuel cell or a polymer electrolyte membrane fuel cell (PEMFC), which has the highest power density among other fuel cells. The PEMFC has a fast start-up time and a fast reaction time for power conversion due to its low operation temperature.

As shown in FIG. 1, a fuel cell stack 10 included in the PEMFC has a membrane-electrode assembly (MEA) 11, in which an electrolyte/catalyst layer (where an electrochemical reaction takes place) is disposed on each of both sides of a polymer electrolyte membrane through which hydrogen ions are transported, a gas diffusion layer (GDL) 12 which functions to uniformly diffuse reactant gases and transmit generated electricity, a gasket 14 and a sealing member (not shown) which functions to provide an appropriate airtightness to reactant gases and coolant and to provide an appropriate bonding to pressure, and a bipolar plate 13 which functions to transmit reactant gases and coolant.

When the fuel cell stack 10 is assembled with the unit cells, a combination of the MEA 11 and the GDL 12 is positioned in the center of each unit cell of the fuel cell stack. The MEA 11 has a cathode and an anode as the electrode/catalyst layer, in which an electrochemical reaction between hydrogen (fuel) and oxygen (oxidant) takes place, disposed on each of both sides of the polymer electrolyte membrane. Moreover, the GDL 12 and the gasket 14 are sequentially stacked on both sides of the MEA 11, where the cathode and the anode are located.

Further, a metallic bipolar plate has been developed to substitute an existing graphite bipolar plate, which consumers a considerable portion of production cost. This metallic bipolar plate allows for mass production by providing an increase in production rate as well as a reduction in the overall production cost.

The metallic bipolar plate can be made from many different metallic materials such as steel, stainless steel, aluminum, etc. Typically, however, the metallic bipolar plates are made from stainless steel.

However, metallic materials are known for having low corrosion resistance, which in turn can affect the stability of electrical conductivity. One known method of reducing or preventing the amount of corrosion is to apply an anti-corrosion coating using a precious metal.

However, even when the anti-corrosion coating is applied, an outer cut portion of the metallic bipolar plate is vulnerable to corrosion, and since the humidified gas is supplied into the fuel cell and water is produced as a by-product of the electrochemical reaction, the metallic bipolar plate is continuously exposed to corrosive environments.

Some previous designs have used an enclosure surrounding the outside of the fuel cell stack to protect the fuel cell stack from water vapor, dust, vacuum, etc., applied from external environments of the vehicle. However, this enclosure can only protect the fuel cell stack from external corrosion factors and, when the water present in the fuel cell stack (such as bipolar plate channels, electrolyte membranes, electrodes, GDLs, etc.) leaks to the outside due to unexpected conditions, the enclosure prevents the water vapor in the enclosure from being discharged to the outside, which may accelerate the corrosion of the metallic bipolar plate. For example, when the airtightness is lost due to damage of the gasket or when the claiming force for clamping the bipolar plate is reduced, the internal water vapor may leak to the outside through a gap in the gasket, which causes serious corrosion to the metallic bipolar plate. Since corrosion of the bipolar plate is associated with the overall safety of the fuel cell and it is thus important to prevent the corrosion as far in advance as possible.

SUMMARY OF THE DISCLOSURE

The present invention provides a fuel cell stack with improved corrosion resistance, in which the outer edge of the fuel cell stack including an outer cut portion of each metallic to bipolar plate can be effectively prevented from being corroded.

In one aspect, the present invention a fuel cell stack with improved corrosion resistance is provided, in which a plurality of unit cells are stacked, the fuel cell stack comprises a waterproof member which is formed on an outer edge of a metallic bipolar plate to seal a gap between joined surfaces of the metallic bipolar plate, a membrane-electrode assembly, a gas diffusion layer, and a gasket from the outside thereof such that water vapor and moisture from the fuel cell stack are prevented from being brought into contact with an outer cut portion of each metallic bipolar plate by the waterproof member.

In the illustrative embodiment of the present invention, the waterproof member may be formed by applying a waterproof liquid to the entire outer edges of the metallic bipolar plate, the membrane-electrode assembly, the gas diffusion layer, and the gasket to cover the outer cut portion of each metallic bipolar plate.

In another embodiment, the waterproof member may also be formed by applying a waterproof tape to the entire outer edges of the metallic bipolar plate, the membrane-electrode assembly, the gas diffusion layer, and the gasket to cover the outer cut portion of each metallic bipolar plate.

In still another embodiment, the waterproof member may be formed by providing a gasket which is interposed between adjacent metallic bipolar plates and compressed by clamping force of the fuel cell stack to surround and completely seal the outer edges of the membrane-electrode assembly and the gas diffusion layer.

The gasket may have a first airtight member interposed and compressed between the to metallic bipolar plate and the membrane-electrode assembly or between the metallic bipolar plate and the gas diffusion layer to maintain the airtightness. Additionally, a second airtight member may be integrally formed with the first airtight member and compressed between adjacent metallic bipolar plates to surround and seal the outer edges of the first airtight member, the membrane-electrode assembly, and the gas diffusion layer.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
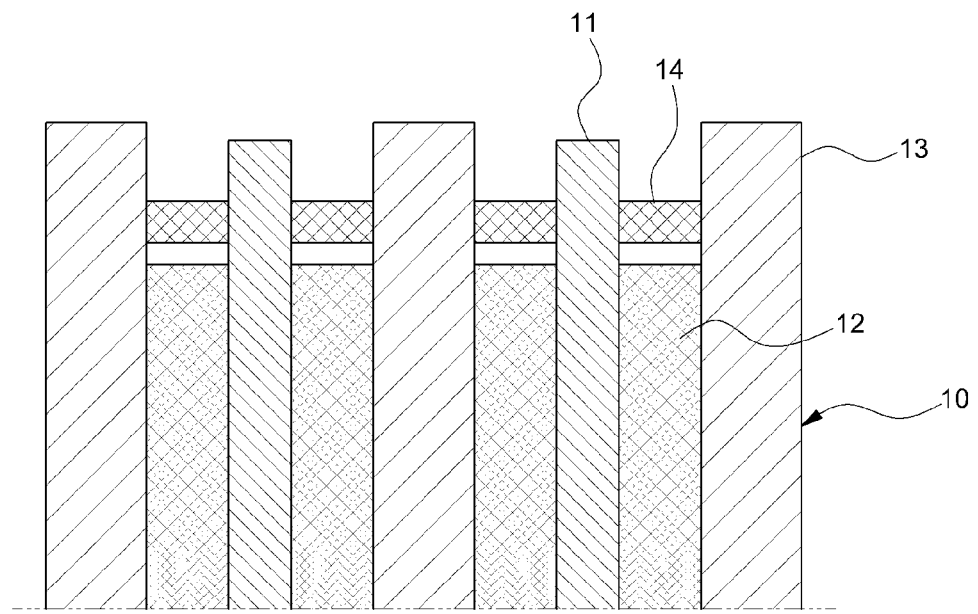
FIG. 1 is a schematic diagram showing the configuration of a typical fuel cell stack.

Reference numerals set forth in the Drawings includes reference to the following elements as further discussed below:

10: fuel cell stack
11: membrane-electrode assembly
12: gas diffusion layer
13: metallic bipolar plate
14: gasket
14a: first airtight member
14b: second airtight member
21a, 21b & 21c: waterproof members It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention provides a fuel cell stack with an anti-corrosion structure provided along the outside thereof, which can effectively prevent a metallic bipolar plate from being corroded by blocking internal water vapor and moisture produced during operation of the fuel cell stack. The anti-corrosion structure prevents corrosion, which may be caused in an outer cut portion of the metallic bipolar plate, and is configured by to sealing a portion from which internal water vapor or moisture may leak to the outside, thus preventing the internal water vapor and moisture from being brought into contact with the outer cut portion of the metallic bipolar plate.

Figure 2:
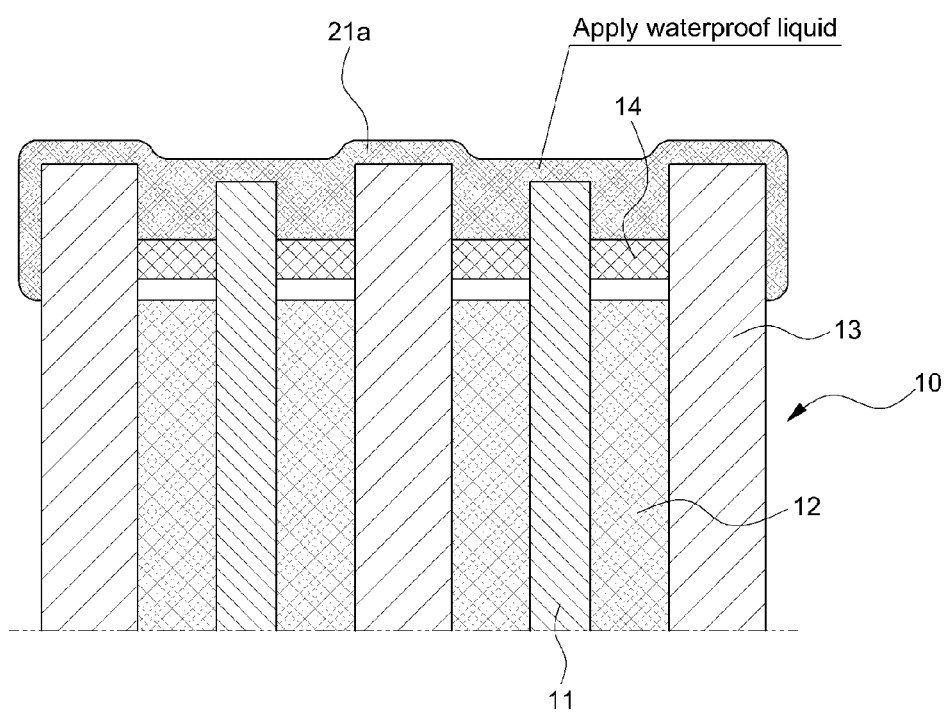
FIG. 2 is a schematic diagram showing the configuration of a fuel cell stack in accordance with an exemplary embodiment of the present invention.
Figure 3:
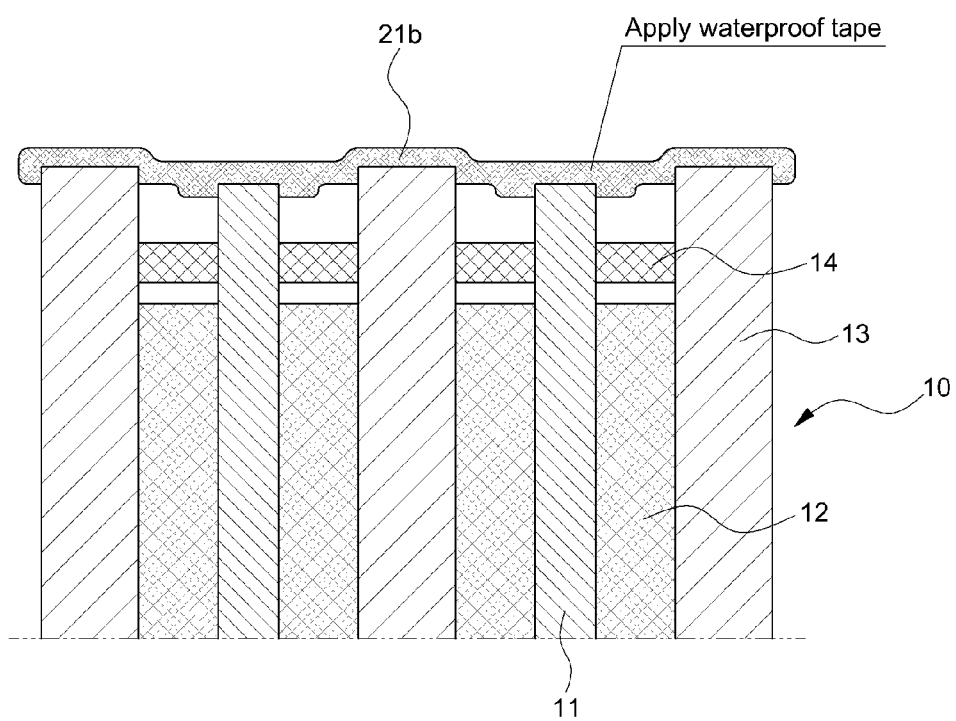
FIG. 3 is a schematic diagram showing the configuration of a fuel cell stack in accordance with another exemplary embodiment of the present invention.
Figure 4:
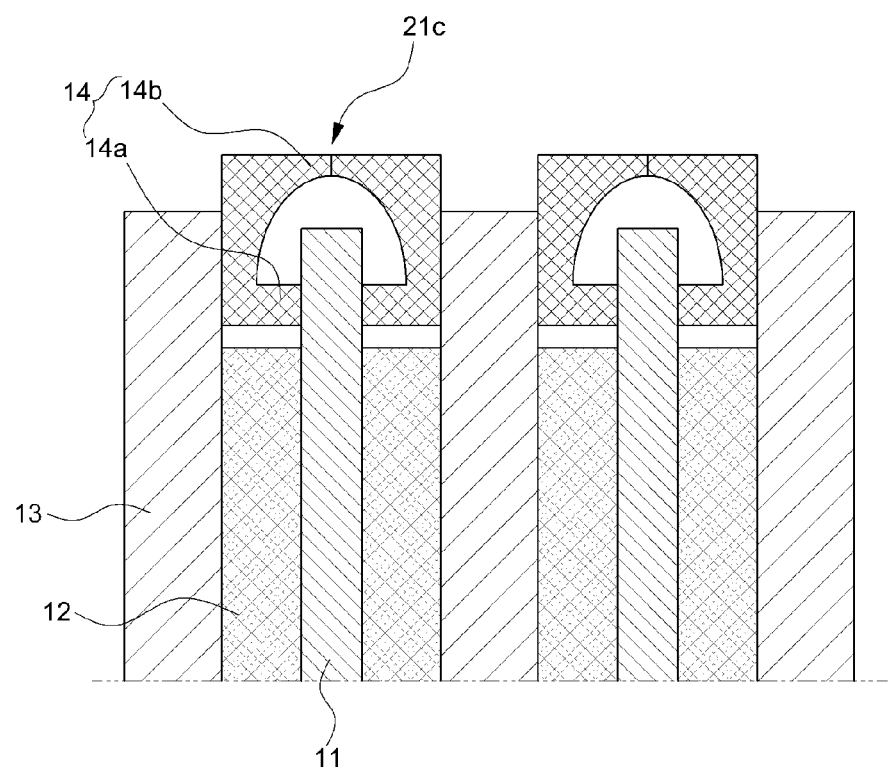
FIG. 4 is a schematic diagram showing the configuration of a fuel cell stack in accordance with still another exemplary embodiment of the present invention.

FIG. 2 is a schematic diagram showing the configuration of a fuel cell stack in accordance with an exemplary embodiment of the present invention, FIG. 3 is a schematic diagram showing the configuration of a fuel cell stack in accordance with another exemplary embodiment of the present invention, and FIG. 4 is a schematic diagram showing the configuration of a fuel cell stack in accordance with still another exemplary embodiment of the present invention.

Next, the exemplary embodiments of the present invention will be described in detail, in which the embodiments have common characteristics, in that a waterproof means capable of sealing a portion from which internal water vapor or moisture may leak to the outside, such as a gap between joined surfaces of a metallic bipolar plate, a membrane-electrode assembly (MEA), a gas diffusion layer (GDL), and a gasket, is provided at the outer edge of the metallic bipolar plate.

First, according to a illustrative embodiment of FIG. 2, a waterproof liquid as the waterproof means is applied to the outer edge of the fuel cell stack 10, in which a plurality of unit cells are stacked, to entirely seal the gap between the joined surfaces of a metallic bipolar plate 13, an MEA 11, a GDL 12, and a gasket 14, thus forming a waterproof member 21a at the outer edge of the fuel cell stack 10 and the metallic bipolar plate 13. As a result, a sealing structure, which serves to prevent the water vapor produced in the fuel cell stack 10 and the moisture of humidified gas from leaking to the outside, is formed.

In application, the waterproof liquid is applied to cover the outer cut portion of each metallic bipolar plate 13 over the entire outer edge of the fuel cell stack 10 including the metallic bipolar plate 13, the MEA 11, the GDL 12, and the gasket 14.

Alternatively, according to another embodiment of FIG. 3, a waterproof tape as the waterproof means is applied to the outer edge of the fuel cell stack 10 to entirely seal the gap between the joined surfaces of the metallic bipolar plate 13, the MEA 11, the GDL 12, and the gasket 14, thus forming a waterproof member 21b at the outer edge of the fuel cell stack 10 and the metallic bipolar plate 13. As a result, a sealing structure, which serves to prevent the water vapor produced in the fuel cell stack 10 and the moisture of humidified gas from leaking to the outside, is formed.

The waterproof tape is applied to cover the outer cut portion of each metallic bipolar plate 13 while surrounding the entire outer edge of the fuel cell stack 10 including the metallic bipolar plate 13, the MEA 11, the GDL 12, and the gasket 14.

The above-described sealing structure is configured by forming the waterproof member 21a or 21b directly at the outer edge of the fuel cell stack 10, especially, at the outer edge of each metallic bipolar plate 13 by applying the waterproof liquid or waterproof tape after assembly of the fuel cell stack 10. The waterproof members 21a and 21b applied so as to completely seal the gap between the joined surfaces of the components of the fuel cell stack such as the metallic bipolar plate 13, the MEA 11, the GDL 12, and the gasket 14 from the outside thereof.

The waterproof liquid and the waterproof tape should preferably be made from materials which have low conductivity and can fill in the gaps between the repetitive components. For example, the waterproof liquid may be made of rubber asphalt, acrylic rubber, chloroprene rubber, polyisocyanate, polyol, urethane rubber containing a crosslinker as a main material ingredient, polyester resin, polymer cement inorganic complex, or the like. The waterproof tape may be embodied as one-sided adhesive tape, a film whose one surface is coated with a polymeric adhesive, a liquid polymer adhesive, and an equivalent or combination thereof. If a liquid polymer adhesive is used, the liquid polymer adhesive may be a thermoplastic adhesive, a thermosetting adhesive, an elastomeric adhesive, and an equivalent thereof, whose viscosity is controlled.

According to still another embodiment of FIG. 4, the shape of the existing gasket 14 interposed between the metallic bipolar plate 13 and the MEA 11 or between the metallic bipolar plate 13 and the GDL 12 is modified to be used as the waterproof means. In detail, as the waterproof means, a waterproof member 21c for entirely sealing the outer edges of the MEA 11 and the GDL 12 between adjacent metallic bipolar plates 13 is formed using the shape-modified gasket 14.

The gasket 14 in this illustrative embodiment includes a first airtight member 14a interposed between the metallic bipolar plate 13 and the MEA 11 or between the metallic bipolar plate 13 and the GDL 12 and compressed by clamping force of the fuel cell stack to maintain the airtightness and a second airtight member 14b integrally formed with the first airtight member 14a and compressed between adjacent metallic bipolar plates 13 to surround and seal the outer edges of the first airtight member 14a, the MEA 11, and the GDL 12.

Here, the second airtight member 14b of the gasket 14 disposed on each metallic bipolar plate 13 is in direct contact with another second airtight member of a gasket joined to an adjacent metallic bipolar plate to surround and seal the outer edges of the first airtight member 14a, the MEA 11, and the GDL 12 from the outside of the first airtight member 14a corresponding to a first sealing structure, thus forming a second sealing structure.

In this structure, the first airtight member 14a mainly serves to maintain the airtightness between the metallic bipolar plate 13 and the MEA 11 or between the metallic bipolar plate 13 and the GDL 12. Moreover, when the second airtight members 14b of adjacent gaskets 14 are in direct contact with each other during stacking of the metallic bipolar plates 13, the second airtight members 14b serve to maintain the airtightness of the outside.

Figure 5:
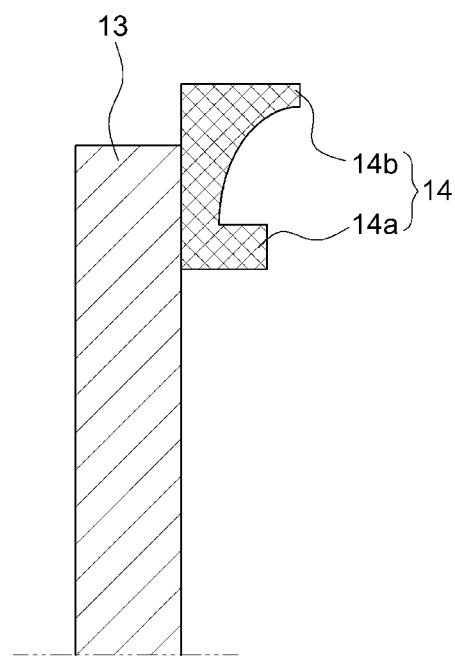
FIG. 5 is a schematic diagram showing a metallic bipolar plate and a gasket in the embodiment of FIG. 4.

FIG. 5 is a schematic diagram showing the metallic bipolar plate and the gasket before being assembled in the embodiment of FIG. 4. As such, when the shape of the gasket 14 is modified, the first and second airtight members 14a and 14b of the gasket 14 form the waterproof member 21c as the waterproof means at the outer edge of the fuel cell stack, and thus a separate external waterproofing treatment using the waterproof liquid or waterproof tape is not required, which reduces the number of processes and improves the workability and productivity.

As described above, according to the fuel cell stack of the present invention, the waterproof member formed at the outer edge of the fuel cell stack and the metallic bipolar plate serves to protect the portions of the fuel cell where corrosion is likely to occur, such as the outer cut portion of each metallic bipolar plate, from the internal water vapor produced during operation of the fuel cell stack and the water vapor of humidified reactant gas, and thus the corrosion of the fuel cell stack can be effectively prevented.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell stack with improved corrosion resistance, in which a plurality of unit cells are stacked, the fuel cell stack comprising:
    a waterproof member which is formed at an outer edge of a metallic bipolar plate to seal a first gap between joined surfaces of the metallic bipolar plate, a membrane-electrode assembly, a gas diffusion layer, and a gasket from the outside thereof such that water vapor and moisture from the fuel cell stack are prevented from being brought into contact with an outer cut portion of each metallic bipolar plate by the waterproof member,
    wherein the waterproof member is formed by providing a gasket which is interposed between adjacent metallic bipolar plates and compressed by clamping force of the fuel cell stack to surround and completely seal the outer edges of the membrane-electrode assembly and the gas diffusion layer, the gasket including:
        a first airtight member interposed and compressed between the metallic bipolar plate and the membrane-electrode assembly or between the metallic bipolar plate and the gas diffusion layer to seal a second gap between the edge of the gas diffusion layer, the membrane-electrode assembly and the metal bipolar plate to maintain the airtightness, one side of the first airtight member being in direct contact with the membrane-electrode assembly without being in direct contact with the gas diffusion layer; and
        a second airtight member integrally formed with the first airtight member and compressed between adjacent metallic bipolar plates to surround and seal a third gap between the first airtight member and the outer edges of the membrane-electrode assembly together with the first airtight member, the second airtight member being in direct contact with another second airtight member of the gasket joined to the adjacent metallic bipolar plate, wherein only the first airtight member is in contact with the membrane-electrode assembly.

2. The fuel cell stack of claim 1, wherein the waterproof member is formed by applying a waterproof liquid to the entire outer edges of the metallic bipolar plate, the membrane-electrode assembly, the gas diffusion layer, and the gasket to cover the outer cut portion of each metallic bipolar plate.

* * * * *